Figure 1:
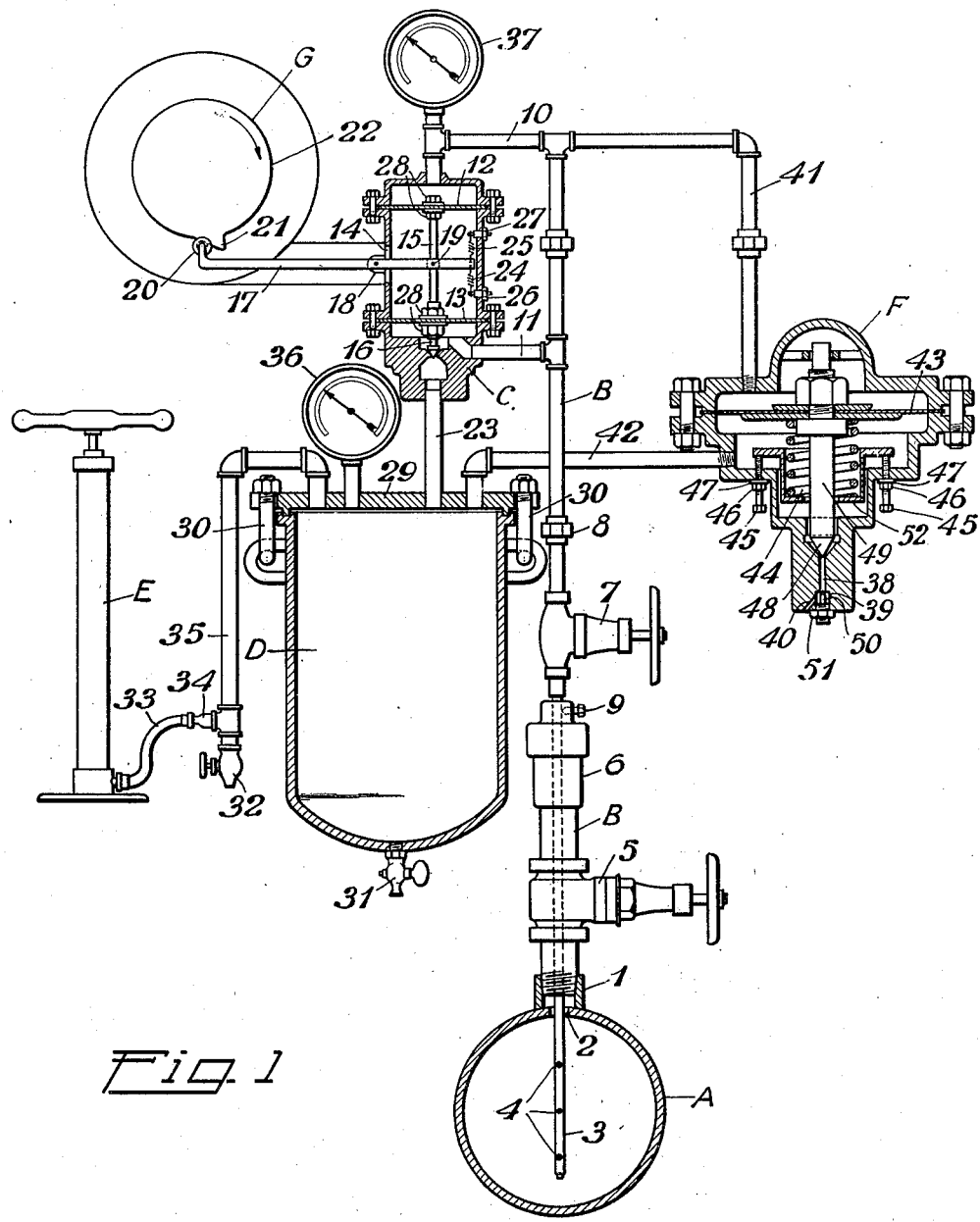

Aug. 31, 1937.                J. R. POLSTON                 2,091,613
                              SAMPLING DEVICE
                           Filed Nov. 5, 1935            2 Sheets-Sheet 1

INVENTOR
John Ray Polston
BY Geo. L. Parkhurst
ATTORNEY

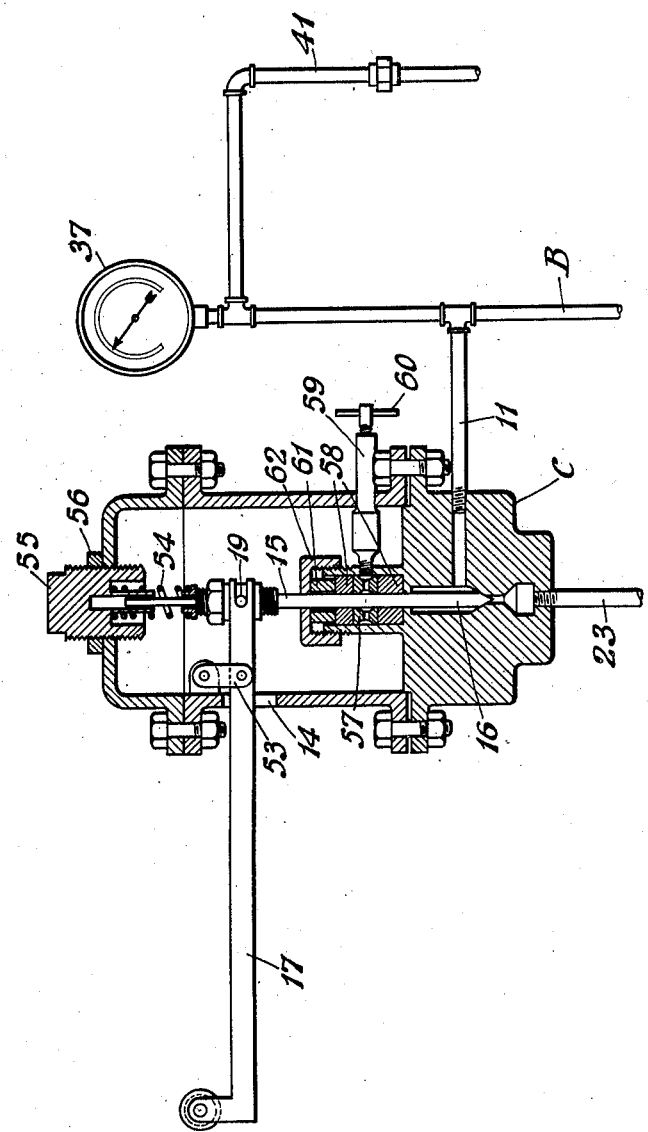

Patented Aug. 31, 1937

2,091,613

UNITED STATES PATENT OFFICE 2,091,613

SAMPLING DEVICE

John Ray Polston, Tulsa, Okla., assignor to Stanolind Pipe Line Company, Tulsa, Okla., a corporation of Maine Application November 5, 1935, Serial No. 48,361

10 Claims. (Cl. 73—21)

This invention relates to devices for sampling liquids flowing through pipe lines under pressure. More particularly it relates to devices for automatically collecting composite samples of liquids flowing through pipe lines under pressure.

It is an object of my invention to provide a sampling device of the type mentioned which will have a high degree of accuracy and will require a minimum of attention. A more detailed object of my invention is to provide a device of the type mentioned in which the pressure differential between a portion of the apparatus connected with the pipe line and the sample container is maintained constant. Another object of my invention is to provide a sampling device utilizing a substantially frictionless valve suitable for operation by a clock-work mechanism. Other objects of my invention will become apparent as the description thereof proceeds.

Figure 1 of the accompanying drawings is a diagrammatic elevation, partly in section, illustrating one specific embodiment of my invention. Figure 2 is a diagrammatic elevation, partly in section, showing an alternative structure for the flow control valve which forms a part of my invention. Other embodiments of my invention will become apparent to those skilled in the art on reading this specification and on studying the drawings which form a part of it.

Referring now more particularly to Figure 1 of the drawings, it will be seen that the sampling device of my invention is connected to pipe line A through which a liquid flows under pressure. This may, for instance, be an oil pipe line. The sample is withdrawn from pipe line A through take-off line B and passes through a flow control valve C into sample container D. A pressure somewhat less than that prevailing in pipe line A is maintained in sample container D, for instance by means of air pump E. The differential in pressure between pipe line A and sample container D is maintained constant by means of pressure control valve F. Flow control valve C is opened periodically by clock-work mechanism G and this results in the accumulation of an accurate composite sample in container D.

The detailed operation of this device will now be described. Pipe line A is provided with a welded nipple 1 placed over a hole 2 in pipe line A. Through this hole projects the lower end of a pipe 3 which is provided with openings 4 so placed and of such size as to remove a sample representative of the material flowing through the entire cross section of pipe line A. Pipe 3 projects through a gate valve 5 and a stuffing box 6 and is connected to a valve 7. When it is desired to remove pipe 3 for inspection, cleaning, replacement, or any other purpose, valve 7 is closed, union 8 is unscrewed and pipe 3, along with valve 7, is pulled upward above gate valve 5 but still within stuffing box 6. Gate valve 5 is then closed and pipe 3 is removed entirely from stuffing box 6. In replacing pipe 3 this procedure is reversed. When the device is in use pipe 3 may be held in place by set screw 9.

The upper end of take-off line B communicates through nipples 10 and 11 with the upper and lower portions, respectively, of flow control valve C. This flow control valve is provided with diaphragms 12 and 13, which may be made of flexible metal or of fabric covered with synthetic rubber. The upper side of diaphragm 12 and the lower side of diaphragm 13 are of equal effective area. The lower side of diaphragm 12 and the upper side of diaphragm 13, also of equal effective area, communicate with the atmosphere through opening 14. Diaphragms 12 and 13 are connected together rigidly by stem 15 and are rigidly connected to needle valve member 16 which may suitably be mounted on the lower end of stem 15. This needle valve member is free to move in a more or less frictionless manner since there is no net pressure exerted upon it. The needle valve is operated by means of lever arm 17 which is pivoted at fixed fulcrum 18 and attached to stem 15 at fulcrum 19. Lever arm 17 carries a roller 20 at its outer end and this roller cooperates with cam 21 carried by disc 22 rotated by clock-work mechanism G, the details of which are conventional and are therefore not shown. Whenever cam 21 contacts roller 20, the outer end of lever arm 17 is depressed, resulting in the raising of needle valve member 16, thereby causing liquid to pass from take-off line B through nipple 11, flow control valve C and nipple 23 into sample container D. After roller 21 has passed cam 20, spring 24, which is stronger than compensating spring 25, forces stem 15 downward, thereby reseating needle valve member 16. Springs 24 and 25 can be adjusted by means of adjusting screws 26 and 27 which are provided with lock nuts. The relative positions of diaphragms 12 and 13 and needle valve member 16 on stem 15 can be adjusted by means of the four valve stem nuts 28.

It will be seen that needle valve member 16 operates independently of the pressure and independently of pressure variations since the pressures exerted on diaphragms 12 and 13 compensate each other. This construction also eliminates the necessity of using stuffing boxes and valve stem guides which would cause friction in this valve. Since flow control valve C is substantially frictionless and because the size of the moving mechanism and the extent of movement are very small it is possible to obtain accurate control and obtain an accurate sample. Furthermore, flow control valve C as constructed lends itself to the use of a spring wound clock for operating power. This is particularly important in the case of remote pipe lines where electric power is not available.

Disc 22 to which cam 20 is attached may suitably rotate once every hour. The result of this is that flow control valve C is opened for a short time once every hour. A composite 24-hour or 48-hour sample can thus be accumulated in sample container D. It will be readily apparent, however, that disc 22 can be made to rotate at any desired speed or that a plurality of cams can be used. The size of the cam or cams can likewise be selected at will and a sample of any desired size can thus be taken at any desired interval.

In the preferred operation of my device the same is put into operation by attaching an empty sample container D to cover plate 29 by means of bolts 30. Petcocks 31 and 32 are closed and the desired air pressure is built up by means of pump E through hose 33, air valve adapter 34 and pipes 35. Any other source of gas pressure can, of course, be used. The pressure is indicated by gauge 36. It is usually desired to build up a pressure within sample container D which is somewhat below that existing in pipe line A as indicated by gauge 37. Thus for instance, in a typical operation when sampling an oil pipe line the pipe line pressure may be 40 lbs./sq. in. and the sample container pressure may be 35 lbs./sq. in., thus giving a differential of 5 lbs./sq. in. Any other desired differential can be used.

As previously mentioned, the desired differential is maintained constant throughout the operation by means of pressure control valve F which operates to permit the escape of gas through ports 38, 39 and 40. The upper side of pressure control valve F communicates with pipe line A through pipe 41 and take-off line B. The lower side of valve F communicates with sample container D through pipe 42. The chambers with which these two pipes communicate are separated by means of a diapragm 43, which may be made of flexible metal or of fabric covered with synthetic rubber. A constant upward pressure is maintained on diaphragm 43 by means of a spring 44. This pressure is predetermined by means of adjustable bolts 45, equipped with lock nuts 46 and lead gaskets 47 to prevent the loss of gas pressure. Bolts 45 are adapted to raise or lower spring cup 52 on which the lower end of spring 44 rests. The result of the introduction of an increment of the sample into the sample container D is of course to raise the pressure in the container. This in turn increases the pressure exerted on the under side of diaphragm 43 and results in a slight lifting of this diaphragm. This in turn results in the lifting of needle valve member 48, which is connected with diaphragm 43 by valve stem 49, and a small amount of gas therefore escapes. A second needle valve member 50, equipped with adjusting nut 51, is used to retard the escape of this gas which ultimately passes out of valve F through channel 40.

Needle valve member 50 results in throttling the escaping air thereby eliminating any tendency on the part of needle valve member 48 to "hunt" or chatter, but the most important function of needle valve member 50 is to prevent the escape of too much air from sample container D. This might otherwise happen on account of inertia forces preventing the rapid fire action of needle valve member 48.

When the desired composite sample has been accumulated in sample container D, the sample may be withdrawn through petcock 31. In many cases, particularly when the sample contains sludgy or emulsifiable material which is not readily removable through a petcock, it is desirable to eliminate petcock 31 entirely and to remove the sample by opening petcock 32 to release the pressure and then detaching sample container D from plate 29. Sample container D can then be cleaned out thoroughly. In either event the sample is collected under pressure which is important since it tends to prevent the evaporation of volatile liquid samples.

Screens or strainers can be used to remove extraneous solids from the material being sampled if desired. Thus a removable strainer can be used around the lower end of pipe 3 or at the inlet to flow control valve C.

Referring now to Figure 2 it will be seen that this illustrates an alternative structure for flow control valve C. Elements 11, 14, 15, 16, 17, 19, 23, 37, and 41 correspond to the similarly numbered elements of Figure 1 and bear the same relationship to the rest of the device shown in Figure 1. However, instead of using two flexible diaphragms as in Figure 1 leakage is prevented with a minimum of friction by means of a grease sealed stuffing box.

In Figure 2, lever arm 17 is pivoted to toggle link 53. This same arrangement can be used in the valve of Figure 1. Valve stem 15 is guided at the top by a valve stem guide and spring adjusting screw 55. After being opened the valve is returned to its normally closed position by a light compression spring 54, the pressure exerted by which can be adjusted by means of adjusting screw 55 and locknut 56. The grease sealed stuffing box comprises a grooved metal grease gland 57, metallic packing 58, a grease cup 59, a grease feed screw 60, a stuffing box gland 61 and a stuffing box cap 62.

The connection at the top of flow control valve C as shown in Figure 1 (nipple 10) is, of course, unnecessary with the flow control valve of Figure 2.

It will be seen that one important feature of my invention resides in removing a sample from a pipe line, the pressure in which may be highly variable, in such manner that the pressure differential across the flow control valve is constant. Other methods of accomplishing this result will occur to those skilled in the art.

It will therefore be understood that while I have described my invention in connection with one specific embodiment, I do not mean to be limited thereby, but only to the subject matter of the appended claims in which I will define the novel features of my invention.

I claim:

1. A device for removing a composite sample of a liquid passing through a pipe line under varying pressure, which comprises a sample receiving means in liquid communication with said pipe line, means for periodically controlling the discharge of liquid from said pipe line to said sample receiving means, and means for maintaining a pressure in said sample receiving means which is less than the varying pressure in said pipe line by a substantially constant amount, said substantially constant pressure differential causing an accurate quantity of liquid to be discharged from said pipe line into said sample receiving means, when said control means is operated.

2. A device for removing a composite sample of a liquid passing through a pipe line under varying pressure which comprises a sample receiving container in liquid communication with said pipe line, and means for controlling the flow of liquid from said pipe line to said container, comprising means responsive to a predetermined pressure differential between said pipe line and said sample container for maintaining the pressure in said sample container below said varying pressure in said pipe line by a definite amount, and means for causing said flow control means to operate periodically, said pressure differential causing a predetermined quantity of liquid to flow from said pipe line to said sample container, when said control means is operated.

3. A device for removing a composite sample of liquid passing through a pipe line under pressure, which comprises a sample receiving container, communicating means between said pipe line and said container, and means for maintaining the pressure in said container at a predetermined differential below the pressure within said pipe line, comprising means responsive to a predetermined change in pressure differential between said pipe line and said container for venting said container, valve means for controlling the flow of liquid through said communicating means, and means for periodically operating said valve control means, said pressure differential causing flow of fluid from said pipe line to said container when said valve is open.

4. A device for removing a composite sample of a liquid passing through a pipe line under pressure, which comprises a take-off line communicating with said pipe line, a sample container, means for filling said sample container with a fluid under pressure, said fluid being immiscible with the liquid to be sampled, a valve connecting said take-off line and said sample container, means for periodically opening said valve, and means responsive to the pressure differential across said valve for releasing said fluid from said sample container to maintain a substantially constant pressure differential across said valve.

5. A device for removing a composite sample of a liquid passing through a pipe line under pressure, which comprises a take-off line communicating with said pipe line, a sample container, means for exerting a gas pressure on said sample container, means responsive to the pressure differential between a portion of said take-off line and said sample container for releasing gas from said sample container to maintain a substantially constant pressure differential between said portion of said take-off line and said sample container, and a valve mechanism to permit a predetermined amount of flow of said liquid from said portion of said take-off line to said sample container at predetermined intervals.

6. A device for removing a composite sample of a liquid passing through a pipe line under pressure, which comprises a take-off line communicating with said pipe line, a flow control valve, one side of which communicates with said take-off line, a sample container communicating with the other side of said flow control valve, means for intermittently opening said flow control valve for a predetermined length of time at predetermined time intervals, means for exerting a gas pressure on said sample container, and a pressure control valve adapted to release gas from said sample container in such manner as to maintain a substantially constant differential in pressure across said flow control valve, said pressure control valve comprising a diaphragm, two chambers separated by said diaphragm, means providing free fluid communication between one of said chambers and one side of said flow control valve, means providing free fluid communication between the other of said chambers and the other side of said flow control valve, and a member responsive to motion of said diaphragm, for controlling the release of said gas.

7. A device for removing a composite sample of a liquid passing through a pipe line, which comprises a sample receiver and means for placing said receiver in liquid communication with said pipe line, means for placing said sample receiver under gas pressure, means associated with said first named means for periodically controlling the same to effect discharge of liquid from said pipe line to said sample receiver, and a pressure control valve comprising an enclosing housing, a diaphragm dividing the interior of said housing into a first chamber and a second chamber, said second chamber being formed with a restricted opening therein, a needle valve member controlling said restricted opening, said needle valve member being connected with said diaphragm, resilient means for biasing said needle valve member to open position, adjusting means for adjusting the biasing effect of said biasing means, said first chamber being in direct communication with said first named means between said periodical control means and said pipe line, said second chamber being in direct communication with said first named means between said periodical control means and said sample receiver, whereby a predetermined change in pressure differential between opposite sides of said diaphragm causes said needle valve member to operate to vent gas from said sample receiver for maintaining a pressure in said sample receiver which is less than the pressure in said pipe line by a substantially constant amount, said substantially constant pressure differential causing an accurate quantity of liquid to be discharged from said pipe line into said sample receiver when said periodical control means is operating.

8. A device for removing a composite sample of a liquid passing through a pipe line under pressure, which comprises a take-off line communicating with said pipe line, a sample container, a substantially frictionless flow control valve interposed between said take-off line and said sample container, and a clock-work mechanism for periodically opening said valve, said valve comprising two flexible diaphragms, one side of one of said diaphragms and the other side of the other of said diaphragms communicating with said take-off line, a valve stem connecting said diaphragms and a valve member connected with said valve stem.

9. A device for removing a composite sample of a liquid passing through a pipe line under pressure, which comprises a take-off line communicating with said pipe line, a sample container, a substantially frictionless flow control valve interposed between said take-off line and said sample container, means for periodically opening said valve, said valve comprising a valve member controlling flow from said take-off line to said sample container and means for preventing the escape of any portion of the material flowing into said valve, and means for maintaining the pressure on the side of said valve adjacent said container at a predetermined differential below the pressure on the side of said valve adjacent said pipe line, comprising means responsive to a predetermined change in pressure differential on opposite sides of said valve for venting said container.

10. A device for removing a composite sample of a liquid passing through a pipe line under pressure, which comprises a take-off line communicating with said pipe line, a sample container, a substantially frictionless flow control valve interposed between said take-off line and said sample container, said valve comprising a valve member controlling flow from said take-off line to said sample container, means for preventing the escape of any portion of the material flowing into said valve and a valve stem attached to said valve member and passing through said means, means for periodically opening said valve, said means cooperating with said valve stem at a point beyond said first-mentioned means, means for restoring said valve to its normally closed position, and means for maintaining the pressure on the side of said valve adjacent said container at a predetermined differential below the pressure on the side of said valve adjacent said pipe line, comprising means responsive to a predetermined change in pressure differential between opposite sides of said valve for venting said container.

JOHN RAY POLSTON.